US012725515B2

(12) United States Patent
Kenig et al.

(10) Patent No.: US 12,725,515 B2
(45) Date of Patent: Sep. 1, 2026

(54) TRAFFIC LIGHT CONTROL BASED ON TRAFFIC PATTERN PREDICTION

(71) Applicant: ITC Intelligent Traffic Control LTD, Tel-Aviv (IL)

(72) Inventors: Dvir Kenig, Tel-Aviv (IL); Aharon Brauner, Rosh HaAyin (IL); Amir B. Geva, Herzliya (IL); Eliyahu Strugo, Jerusalem (IL)

(73) Assignee: ITC Intelligent Traffic Control LTD, Tel-Aviv (IL)

( * ) Notice: Subject to any disclaimer, the term of this patent is extended or adjusted under 35 U.S.C. 154(b) by 0 days.

(21) Appl. No.: 18/687,333

(22) PCT Filed: Aug. 30, 2022

(86) PCT No.: PCT/IL2022/050949

§ 371 (c)(1),
(2) Date: Feb. 28, 2024

(87) PCT Pub. No.: WO2023/031926

PCT Pub. Date: Mar. 9, 2023

(65) Prior Publication Data

US 2024/0355200 A1 Oct. 24, 2024

Related U.S. Application Data

(60) Provisional application No. 63/238,822, filed on Aug. 31, 2021.

(51) Int. Cl.
*G08G 1/07* (2006.01)
*G06V 10/774* (2022.01)
(Continued)

(52) U.S. Cl.
CPC ............. *G08G 1/07* (2013.01); *G06V 10/774* (2022.01); *G06V 20/54* (2022.01); *G08G 1/0145* (2013.01); *G06V 2201/08* (2022.01)

(58) Field of Classification Search
CPC ...... G08G 1/07; G08G 1/0145; G06V 10/774; G06V 20/54; G06V 2201/08
See application file for complete search history.

(56) References Cited

U.S. PATENT DOCUMENTS 10,198,942 B2 * 2/2019 Ginsberg ............. G08G 1/0133
10,643,465 B1 * 5/2020 Girardot .................. G08G 1/07
(Continued)

FOREIGN PATENT DOCUMENTS

WO WO 2023/031926 3/2023

OTHER PUBLICATIONS

International Preliminary Report on Patentability Dated Mar. 14, 2024 From the International Bureau of WIPO Re. Application No. PCT/IL2022/050949 (7 Pages).
(Continued)

*Primary Examiner* — Mohamed Barakat

(57) ABSTRACT

Disclosed herein are systems and methods for controlling traffic lights according to predicted traffic patterns, comprising receiving one or more image sequence comprising a plurality of images captured by one or more imaging sensor deployed to monitor vehicle traffic in one or more intersection in which traffic light(s) is deployed to control traffic flow, generating a traffic dataset descriptive of time series movement of all vehicles tracked in the image sequence(s), applying a first trained machine learning model to map, based on the traffic dataset, a traffic pattern of the tracked vehicles to one or more of a plurality of learned traffic patterns, applying a second trained machine learning model to predict one or more subsequent traffic patterns based on the mapped traffic pattern, and generating instructions for controlling the traffic light(s) according to the predicted subsequent traffic pattern(s).

17 Claims, 6 Drawing Sheets

(51) Int. Cl.

| | |
|---|---|
| ***G06V 20/54*** | (2022.01) |
| ***G08G 1/01*** | (2006.01) |

(56) References Cited

U.S. PATENT DOCUMENTS

| | | | | |
|---|---|---|---|---|
| 10,997,461 | B2 * | 5/2021 | Elluswamy | G05D 1/0221 |
| 2014/0267734 | A1 * | 9/2014 | Hart, Jr. | G08G 1/07 348/149 |
| 2018/0190111 | A1 * | 7/2018 | Green | G08G 1/052 |
| 2019/0043349 | A1 * | 2/2019 | Hofman | G08G 1/0116 |
| 2019/0347821 | A1 * | 11/2019 | Stein | G08G 1/096725 |
| 2020/0042799 | A1 | 2/2020 | Iiuang et al. | |
| 2022/0019225 | A1 * | 1/2022 | Foley | G06V 10/806 |
| 2022/0157161 | A1 * | 5/2022 | Tan | G06F 18/2415 |

OTHER PUBLICATIONS

International Search Report and the Written Opinion Dated Dec. 15, 2022 From the International Searching Authority Re. Application No. PCT/IL2022/050949. (8 Pages).

Espinosa Valcarcel et al. "Machine Vision Algorithms Applied to Dynamic Traffic Light Control", Dyna, 80(178): 132-140, Apr. 2013.

Greguric et al. "Application of Deep Reinforcement Learning in Traffic Signal Control: an Overview and Impact of Open Traffic Data", Applied Sciences, 10(11): 4011-1-4011-25, Published Online Jun. 10, 2020.

Kim et al. "Cooperative Traffic Signal Control With Traffic Flow Prediction in Multi-Intersection", Sensors, 20(1): 137-1-137-15, Published Online Dec. 24, 2019.

* cited by examiner

TRAFFIC LIGHT CONTROL BASED ON TRAFFIC PATTERN PREDICTION

RELATED APPLICATIONS

This application is a National Phase of PCT Patent Application No. PCT/IL2022/050949 having International filing date of Aug. 30, 2022, which claims the benefit of priority under 35 USC § 119(e) of U.S. Provisional Patent Application No. 63/238,822 filed on Aug. 31, 2021. The contents of the above applications are all incorporated by reference as if fully set forth herein in their entirety.

FIELD AND BACKGROUND OF THE INVENTION

The present invention, in some embodiments thereof, relates to controlling intersections traffic lights, and, more specifically, but not exclusively, to relates to controlling intersections traffic lights based on predicted traffic patterns.

The volume of commuters using private and public transportation is constantly increasing in giant steps all over the world and is painfully felt in massive vehicles traffic congestion evident in most if not all major cities.

Traffic buildups and traffic jams resulting in significant time spent in commuting may be directly translated to major lost costs for loss of productive time.

Traffic congestions are also one of the major contributors to the Global Greenhouse Gas (GHG) emissions since slow moving and more so stand still vehicles may release increased volumes of polluting agents to the air.

The extended pollution of toxic agents caused by the extended travel time of huge volumes of vehicles may be also a major cause for a wide range of modern era health syndromes, diseases and illnesses. Moreover, as demonstrated by multiple researches, the prolonged commuting time may further have mental implications.

SUMMARY OF THE INVENTION

According to a first aspect of the present invention there is provided a computer implemented method of controlling traffic lights according to predicted traffic patterns, comprising:

Receiving one or more image sequences comprising a plurality of images captured by one or more imaging sensors deployed to monitor vehicle traffic in one or more intersections. One or more traffic lights are deployed in the one or more intersections to control traffic flow.

Generating a traffic dataset descriptive of time series movement of all vehicles tracked in the one or more image sequences.

Applying a first trained machine learning model to map, based on the traffic dataset, a traffic pattern of the tracked vehicles to one or more of a plurality of learned traffic patterns.

Applying a second trained machine learning model to predict one or more subsequent traffic patterns based on the mapped traffic pattern.

Generating instructions for controlling the one or more traffic lights according to the one or more predicted subsequent traffic patterns.

According to a second aspect of the present invention there is provided a system for controlling traffic lights according to predicted traffic patterns, comprising one or more processor executing a code. The code comprising:

Code instructions to receive one or more image sequences comprising a plurality of images captured by one or more imaging sensors deployed to monitor vehicle traffic in one or more intersections. One or more traffic lights are deployed in the one or more intersections to control traffic flow.

Code instructions to generate a traffic dataset descriptive of time series movement of all vehicles tracked in the one or more image sequences.

Code instructions to apply a first trained machine learning model to map, based on the traffic dataset, a traffic pattern of the tracked vehicles to one or more of a plurality of learned traffic patterns.

Code instructions to apply a second trained machine learning model to predict one or more subsequent traffic patterns based on the mapped traffic pattern.

Code instructions to generate instructions for controlling the one or more traffic lights according to the one or more predicted subsequent traffic patterns.

According to a third aspect of the present invention there is provided a computer program product for controlling traffic lights according to predicted traffic patterns, comprising a non-transitory medium storing thereon computer program instructions which, when executed by one or more hardware processor, cause the one or more hardware processor to:

Receive one or more image sequences comprising a plurality of images captured by one or more imaging sensors deployed to monitor vehicle traffic in one or more intersections. One or more traffic lights are deployed in the one or more intersections to control traffic flow.

Generate a traffic dataset descriptive of time series movement of all vehicles tracked in the one or more image sequences.

Apply a first trained machine learning model to map, based on the traffic dataset, a traffic pattern of the tracked vehicles to one or more of a plurality of learned traffic patterns.

Apply a second trained machine learning model to predict one or more subsequent traffic patterns based on the mapped traffic pattern.

Generate instructions for controlling the one or more traffic lights according to the one or more predicted subsequent traffic patterns.

In an optional implementation form of the first and second aspects, the instructions for controlling the one or more traffic lights are generated according to a control plan selected based on a simulation of a plurality of control plans applied to control the one or more traffic lights for controlling a flow of vehicles defined by the one or more predicted subsequent traffic patterns.

In a further implementation form of the first and second aspects, the simulation is directed to predict a flow of vehicles through the one or more intersections where the selected control plan is estimated to induce optimal flow expressed by a reduced time for the vehicles to pass the one or more intersections.

In a further implementation form of the first and second aspects, the traffic dataset comprises one or more of: one or more vehicle parameters of each tracked vehicle and one or more lane parameters of each lane in the one or more intersection. The one or more vehicle parameters and the one or more lane parameters are identified based on analysis of the one or more image sequences.

In a further implementation form of the first and second aspects, the one or more vehicle parameter are members of a group consisting of: a vehicle type, a lane, a position in the lane, a position in a queue in the lane, a location, a relative location with respect to one or more other vehicles, a type of adjacent vehicles, a speed, an acceleration, a wait time at the one or more intersections, a distance form a stop line of the one or more intersections, and/or an overall tracking time.

In a further implementation form of the first and second aspects, the one or more lane parameters are members of a group consisting of: a number of vehicles in the lane, a type of vehicles in the lane, an order of the vehicles in of a queue in the lane, a length of the queue, and/or a lane crossing time duration.

In an optional implementation form of the first and second aspects, the analysis further comprises filtering out one or more objects unrelated to tracked vehicles detected in the one or more image sequences.

In a further implementation form of the first and second aspects, the analysis further comprises applying one or more trained models to track one or more partially visible vehicles in the one or more image sequences. The one or more partially visible vehicles are at least partially invisible in one or more of the plurality of images.

In a further implementation form of the first and second aspects, the first machine learning model is trained using a plurality of traffic datasets generated based on a plurality of previously captured image sequences of the one or more intersections.

In a further implementation form of the first and second aspects, the first machine learning model is trained in one or more unsupervised training sessions to map the plurality of traffic patterns of vehicles detected at the one or more intersections to a plurality of respective clusters.

In a further implementation form of the first and second aspects, the first machine learning model is further trained post-deployment using a plurality of traffic datasets generated based on a plurality of image sequences captured after the deployment.

In a further implementation form of the first and second aspects, the second machine learning model is trained in one or more supervised training sessions using a plurality of consecutive mapping sequences of a plurality of traffic datasets generated based on a plurality of previously captured image sequences of the one or more intersections.

In a further implementation form of the first and second aspects, the second machine learning model is further trained post-deployment using a plurality of consecutive mapping sequences of a plurality of traffic datasets generated based on a plurality of image sequences of the one or more intersections captured after the deployment.

In a further implementation form of the first and second aspects, at least part of the process to control the one or more traffic lights is executed by an edge node deployed at the one or more intersections which is functionally coupled to the one or more imaging sensors.

In a further implementation form of the first and second aspects, at least part of the process to control the one or more traffic lights is executed by a remote server which is communicatively coupled to the one or more imaging sensors via one or more networks.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
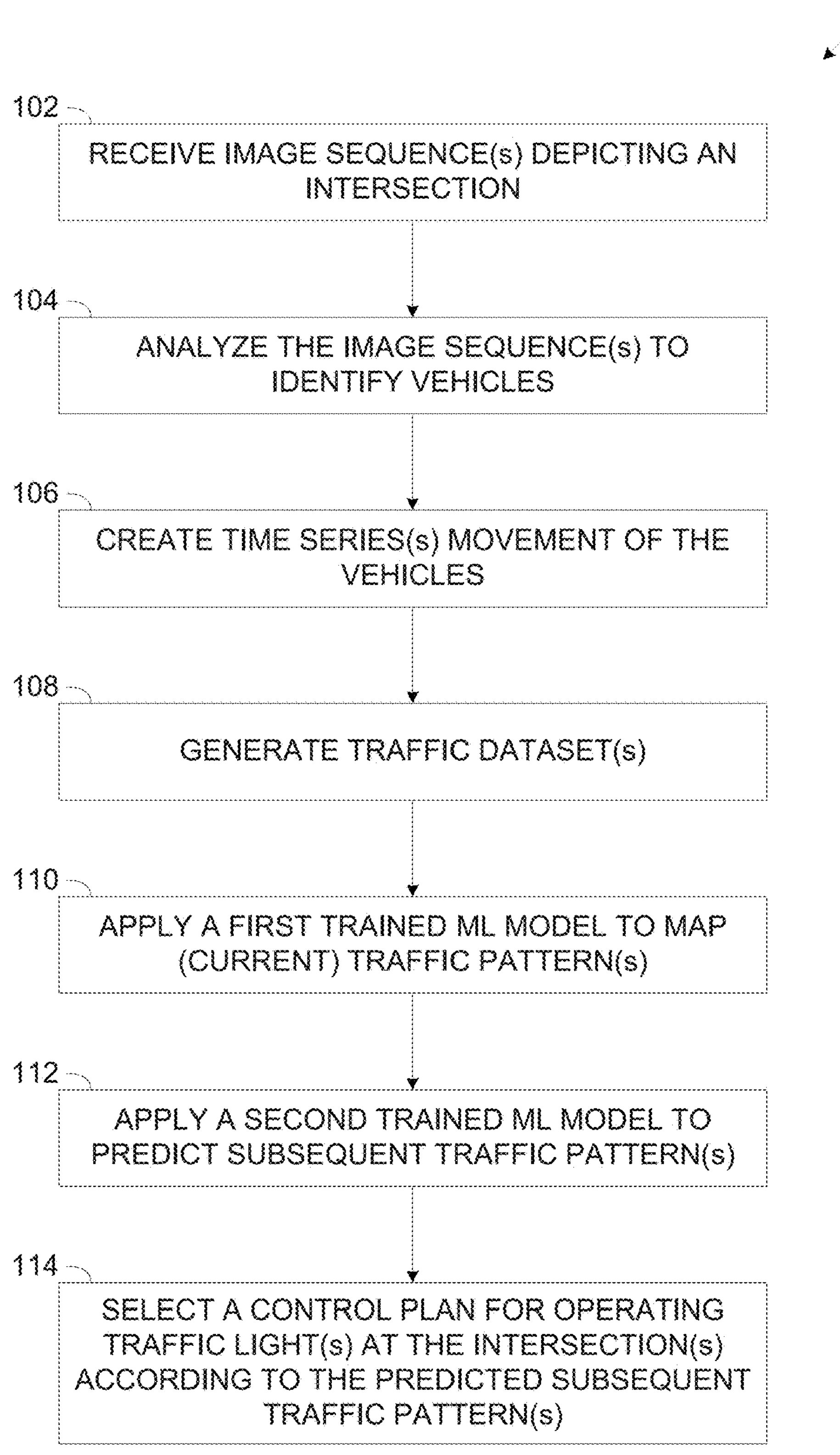
FIG. 1 is a flowchart of an exemplary process of controlling one or more traffic lights at an intersection based on traffic patterns predicted for vehicles crossing the intersection, according to some embodiments of the present invention.

The present invention, in some embodiments thereof, relates to controlling intersections traffic lights, and, more specifically, but not exclusively, to relates to controlling intersections traffic lights based on predicted traffic patterns.

According to some embodiments of the present invention, there are provided methods, systems, devices and computer software programs for controlling one or more traffic lights deployed to regulate vehicle traffic at one or more intersections based on traffic patterns predicted for vehicles crossing the intersection(s), i.e. vehicles arriving, passing through and/or leaving the intersection(s).

The traffic lights deployed in the intersection and/or in several inter-related intersections which may have traffic effect on each other may be controlled to improve the vehicles traffic flow through the intersection(s) which may be defined by one or more parameters and/or criteria, for example reduced traffic congestion, reduced intersection(s) cross time, reduced overall wait time at the intersection(s), increased volume of commuters travelling in the vehicle through the intersection(s) and/or the like.

One or more imaging sensors, for example, a camera, a video camera, a thermal imaging camera, an Infrared (IR) sensor, a night vision sensor and/or the like deployed to monitor the intersection(s) may capture one or more image sequences, for example, a video stream, a sequence of frames and/or the like depicting vehicles crossing the intersection(s).

The image sequence(s) may be visually analyzed to detect and track vehicles crossing the intersection(s), i.e. coming in, crossing and leaving the intersection(s) to express movement over time of the vehicles tracked in the intersection(s). Moreover, one or more time-series movement pattern may be created for the vehicles detected and tracked in the intersections(s) to express the movement over time of the tracked vehicles.

The time-series movement pattern(s) of the tracked vehicles may be than converted to create one or more traffic dataset descriptive of the flow of traffic through the intersection(s). The traffic datasets may comprise one or more vehicle parameters of the tracked vehicles and/or one or more lane parameters of the lanes in the intersection(s). The vehicle parameters may include, for example, a vehicle type (e.g. car, truck, bus, motorcycle, etc.), a lane(s) in which the respective vehicle is moving, a position in the lane, a position in a queue in the lane, a location, a relative location with respect to one or more other vehicles, a type of one or more adjacent vehicles, a speed, an acceleration, a wait time at the intersection, a distance form a stop line, an overall tracking time and/or the like. The lane parameters may include, for example, a number of vehicles in the lane, a type of the vehicles, an order of the vehicles in a queue in the lane, a length of the queue, a lane crossing time duration and/or the like.

The traffic dataset(s) may be constructed according to one or more mathematically convenient representations to support efficient processing of the traffic flow through the intersection(s). For example, the traffic datasets may be generated as one or more matrices where each vehicle may be represented by a respective vector in the matrix(s) with its vehicle parameters changing over time. Optionally one or more lanes in the intersection(s) may be also represented by respective vectors in the traffic dataset(s) with their detected lane parameters changes over time.

A trained first Machine Learning (ML) model associated and specifically trained for the intersection(s) may be applied to the traffic dataset to map a traffic flow of the vehicles at the intersection(s) to one or more of a plurality of traffic patterns, specifically, traffic patterns learned for the specific intersection(s). Each traffic pattern may define a state, a flow, a number, a distribution and/or the like of the traffic in the intersection(s). Moreover, since the traffic dataset(s) may be descriptive of the traffic flow through the intersection(s) over time, the trained first ML model may map the traffic dataset(s) to a consecutive mapping sequence comprising one or more consecutive traffic patterns traffic patterns mapped for the traffic flowing through the intersection(s) over time.

The first ML model, for example, a classifier, a neural network, a Support Vector Machine (SVM) and/or the like may be utilized using one or more technologies, architectures and/or implementations, for example, a Convolutional Neural Network (CNN), a Recurrent Neural Network (RNN), a Forward-Feed (FF) Neural Network, a Deep Neural Network (DNN) and/or the like.

The first ML model may be trained in one or more unsupervised training sessions to map the traffic flow of vehicle through the intersection(s) to one or more of a plurality of clusters learned during the training where the clusters correspond to traffic patterns such that the unsupervised first ML model may divide the traffic patterns distribution space to the plurality of clusters. The first ML model may be trained using a plurality of training traffic datasets generated for the intersection(s) based on image sequences previously captured to depict vehicles traffic in the intersection(s). The training traffic datasets may be further generated based on image sequences previously captured during different times, for example, different time of the day, different days of the week, different times of the year and/or the like.

The first ML model may therefore adjust, adapt, evolve and/or learn the traffic patterns typical to its specific associated intersection(s). Moreover, trained using the time different datasets, the first ML model may further adapt to efficiently map the traffic patterns of the vehicles traffic flow through the intersection(s) with respect to time. Optionally, the first ML model may be further trained after deployed using traffic datasets generated based on image sequences captured after the first ML model is trained is deployed.

A second trained ML model may be than applied to the traffic pattern(s), specifically to the consecutive mapping sequence mapped by the trained first ML model to predict one or more subsequent traffic patterns estimated for vehicles that may pass through the intersection(s) in a future time, in particular the near future, for example, a minute, ten minutes, twenty minutes, half an hour and/or the like. The subsequent traffic pattern(s) may thus describe the future traffic flow through the intersection(s).

The second ML model, for example, neural network such as, for example, a CNN, an RNN, an FF Neural Network, a DNN and/or the like may be trained with a plurality of consecutive mapping sequences comprising consecutive traffic patterns mapped by the first ML model for the intersection. The trained second ML model may be a supervised ML model trained to predict the subsequent traffic pattern(s) in a supervised manner in one or more supervised training sessions using a plurality of consecutive mapping sequences mapped by the first ML model for the traffic flows through the intersection(s) based on the plurality of previously captured image sequences depicting the traffic in the intersection(s).

The second ML model may therefore adjust, adapt, evolve and/or learn the traffic patterns, specifically the traffic patterns sequences typical to its associated specific intersection(s). The second ML model may be further trained with a plurality of consecutive mapping sequences mapped during different times such that the second ML model may further adapt to accurately, reliably and/or robustly predict the subsequent traffic pattern(s) with respect to time. Optionally, the second ML model may be further trained after deployed using consecutive mapping sequences mapped by the first ML model based on traffic datasets generated based on image sequences captured after the second ML model is trained is deployed.

A control plan may be than selected according to the predicted traffic pattern(s) for operating one or more of the traffic lights deployed at the intersection(s) to control, direct and/or regulate the traffic predicted to cross the intersection(s) according to the predicted subsequent traffic patterns. As mentioned herein before, the control plan may be selected according to one or more of the parameters and/or criteria defined to improve the vehicles traffic flow through the intersection(s).

Optionally, a plurality of control plans, either predefined and/or learned, may be simulated to estimate and evaluate the traffic flow which may result from applying each of the control plans. The estimated traffic flows may be further evaluated to identify an optimal control plan that may yield a traffic flow which complies with one or more of the traffic flow improvement parameters and/or criteria.

Instructions may be than generated and sent to one or more control units configured to operate the traffic light(s) according to the selected control plan.

Operating the traffic lights to regulate traffic according to predicted traffic patterns may present major benefits and advantages compared to currently existing methods and systems for controlling vehicles traffic.

First, predicting the subsequent traffic patterns may enable operating the traffic lights according to the predicted future traffic flow rather than the current traffic flow as may be done by the existing methods. Operating the traffic lights according to the currently detected traffic flow may be highly inefficient since in many scenarios it may be already too late to effectively regulate the traffic to achieve improve the traffic flow through the intersection(s), for example, reduce congestion, reduce travel time and/or the like. In contrast, operating the traffic lights according to the predicted future traffic patterns may provide sufficient time for efficiently regulating the traffic flow through the intersection(s).

Moreover, mapping the current traffic patterns of traffic crossing the intersection(s) and predicting future subsequent traffic patterns may allow for detection of potential traffic jams in their early stage such that a suitable control plan may be selected to operate the traffic lights to prevent the buildup of such traffic jam and/or highly congested intersection(s).

Furthermore, different traffic conditions, flows and/or patterns may apply to different intersections. Therefore, a plurality of first and second ML models maybe deployed where each set of first and second ML models may be associated and trained for a specific intersection and/or several inter-related intersections. As such, each set of first and second ML models may efficiently adapt, adjust, evolve and/or learn the traffic patterns typical to its associated intersection(s).

In addition, by further training the first ML models and/or the second ML model after trained and deployed to support operating of the traffic lights at the intersection(s), the first and second ML models may further adapt and adjust to one or more new and/or adjusted traffic patterns of traffic crossing the intersection(s) which may be affected by one or more traffic changes and/or conditions, for example, construction work, change in traffic volume, change in traffic directions and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, FIG. 1 is a flowchart of an exemplary process of controlling one or more traffic lights at an intersection based on traffic patterns predicted for vehicles crossing the intersection, according to some embodiments of the present invention.

An exemplary process 100 may be executed by an edge node and/or a remote server to control traffic through one or more intersections by controlling one or more traffic lights deployed at the intersection(s) to control, direct and/or regulate vehicles arriving, passing and/or leaving the intersection(s).

Controlling the traffic light(s) may be done based on one or more traffic patterns predicted for the vehicles arriving, crossing and leaving the intersection(s).

First, visual data, specifically one or more image sequences depicting the intersection(s) may be analyzed to detect and track the vehicles coming in, crossing and exiting the intersection(s). Based on visually analysis of the image sequence(s) to detect and track vehicles through the intersection(s), a time series may be then generated for each vehicle detected at the intersection(s) to express movement over time of the respective vehicle. Moreover, a time series may be generated for each lane in the intersection(s) based on the visual analysis to express the movement of time of vehicles in the respective lane.

The time series movement of all vehicles and lanes at the intersection(s) may be than converted to a traffic dataset descriptive of the movement (over time) of the vehicles and a first trained ML model may be applied to the traffic dataset to map a traffic pattern of the vehicle at the intersection(s) to one or more of a plurality of traffic patterns, specifically, traffic patterns learned for the specific intersection(s).

A second trained ML model may be than applied to the mapped traffic pattern(s) to predict one or more subsequent traffic patterns estimated for vehicles that may pass through the intersection(s) in a future time, in particular the near future, for example, a minute, ten minutes, twenty minutes, half an hour and/or the like.

A control plan may be than selected for controlling the traffic light(s) at the intersection(s) according to the predicted traffic pattern(s). The control plan may be selected according to one or more optimization criteria, for example, reduce overall time of vehicles to pass through the intersection(s), reduce an overall wait time and/or the like.

Moreover, a plurality of predefined and/or learned control plans may be simulated for the predicted traffic pattern(s) and based on the traffic flow identified and/or estimated for each simulated control plan, an optimal control plan may be selected.

Figure 2A:
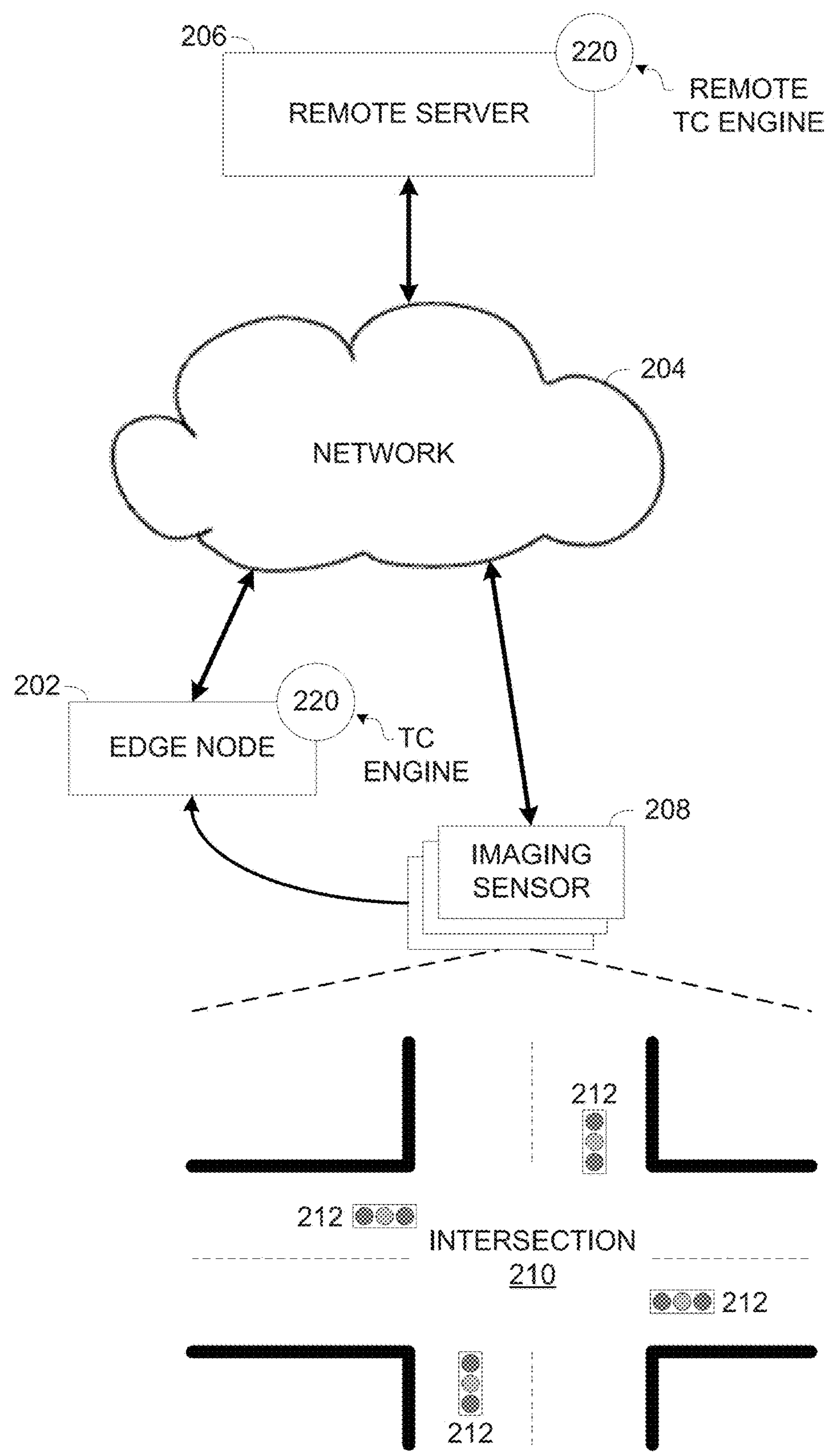
FIG. 2A and FIG. 2B are schematic illustrations of an exemplary system for controlling one or more traffic lights at an intersection based on traffic patterns predicted for vehicles crossing the intersection, according to some embodiments of the present invention.
Figure 2B:
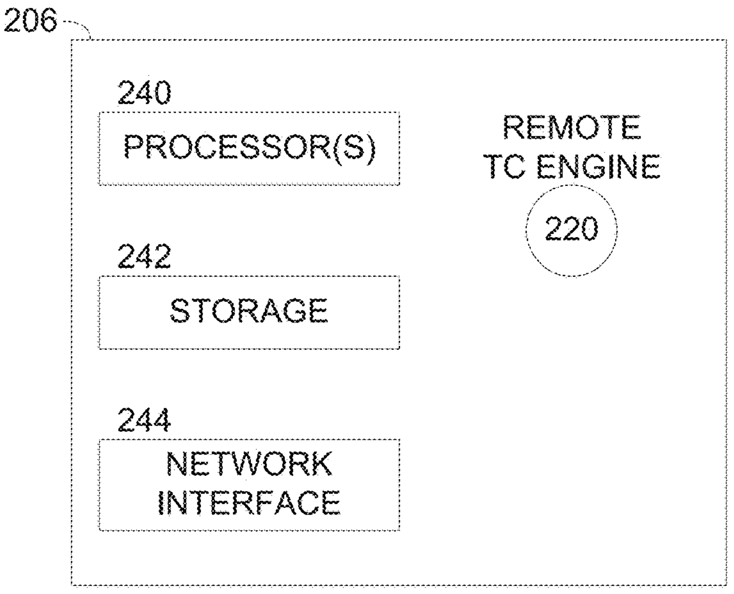
Figure 2B:
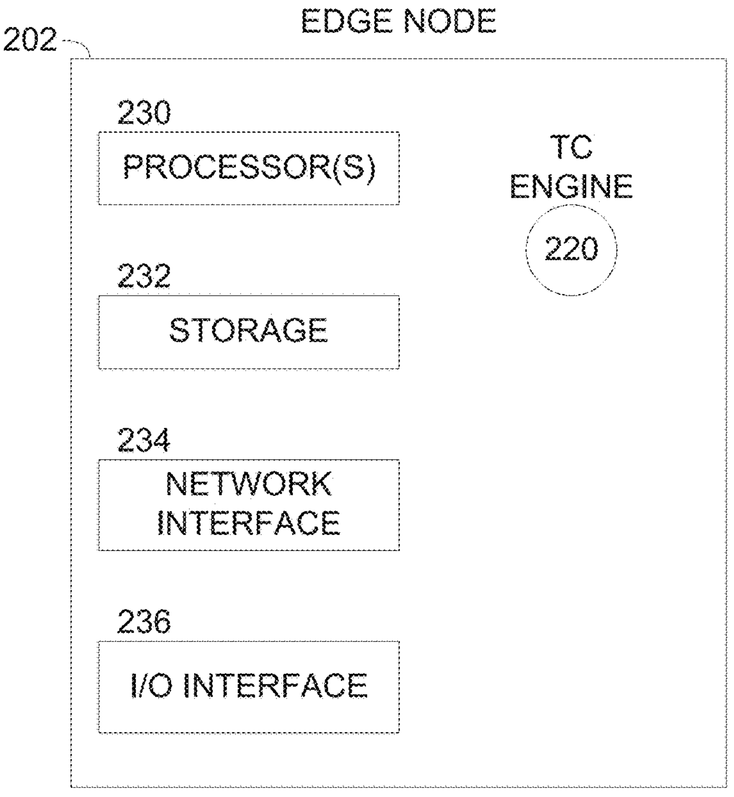

Reference is also made to FIG. 2A and FIG. 2B, which are schematic illustrations of an exemplary system for controlling one or more traffic lights at an intersection based on traffic patterns predicted for vehicles crossing the intersection, according to some embodiments of the present invention.

As seen in FIG. 2A, an edge node 202, for example, a server, a processing node, a cluster of processing nodes, a gateway, an access point and/or the like may be deployed to execute the process 100 and/or part thereof for controlling one or more traffic lights 212 deployed at one or more intersections 210 to control vehicles traffic coming in, passing though and/or leaving the intersection(s) 210.

The intersection 210 portrayed in FIG. 2A is of course exemplary and should not be construed as limiting since the intersection 210 may include a different number (more or less) of lanes, a different number of entries and/or exits, a different number and/o deployment of traffic lights 212 and/or the like.

The edge node 202 may be deployed at an edge of a network 204 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like. The edge node 202 may be therefore in close network proximity, i.e., few hops (e.g., one, two, etc.) to one or more access points of the network 204 providing network connectivity to end devices, for example, client devices (e.g. cellular phones, tablets, computers, etc.), monitor and/or control devices (e.g. sensors, controllers, IoT devices, etc.), vehicle mounted devices and/or the like located at the intersection(s) 210.

In particular, the edge node 202 may communicate with one or more imaging sensors 208 deployed to monitor the intersection 210, specifically to monitor and capture imagery data, specifically, one or more image sequences, for example, a video stream, a sequence of frames and/or the like of the vehicles arriving, crossing and/or leaving the intersection(s) 210. The imaging sensor(s) 208 may include one or more sensors and/or devices employing on or more imaging technologies, for example, a camera, a video camera, a thermal imaging camera, an Infrared (IR) sensor, a night vision sensor and/or the like.

As seen in FIG. 2B, the edge node 202 may comprise a processor(s) 230, a storage 232 for storing data and/or code (program store), a network interface 234 and optionally an Input/Output (I/O) interface 236 for connecting to one or more external and/or attachable devices.

The network interface 234 may include one or more wired and/or wireless network interfaces for connecting to the network 204, for example, a LAN interface, a WLAN interface, a WAN interface, a MAN interface, a cellular interface and/or the like.

The processor(s) 230, homogenous or heterogeneous, may include one or more processing nodes and/or cores arranged for parallel processing, as clusters and/or as one or more multi core processor(s). The processor(s) 230 may further, integrate, utilize and/or facilitate one or more hardware elements (modules) integrated and/or utilized in the edge node 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The storage 232 may include one or more non-transitory persistent storage devices, for example, a Read Only Memory (ROM), a Flash array, a Solid State Drive (SSD), a hard drive (HDD) and/or the like. The storage 232 may also include one or more volatile devices, for example, a Random Access Memory (RAM) component, a cache and/or the like. The storage 232 may further comprise one or more network storage devices, for example, a storage server, a Network Accessible Storage (NAS), a network drive, a database server and/or the like accessible through the network interface 234.

The I/O interface 236 may include one or more wired and/or wireless I/O interfaces, for example, a Universal Serial Bus (USB) port, a serial port, a Bluetooth (BT) interface, a Radio Frequency (RF) interface, an infrared (IR) interface, a Near Field (NF) interface and/or the like for communicating and/or attaching to one or more external devices and/or attachable devices.

As such, via the network interface 234, the edge node 202 may communicate over the network 204 with one or more of the imaging sensor(s) 208 having network connectivity. Moreover, via the I/O interface 236, the edge node 202 may communicate directly with one or more of the imaging sensor(s) 208 which are not have connected to the network 204 but rather communicate via one or more of the wired and/or wireless I/O interfaces supported by the I/O interface 236.

The processor(s) 230 may execute one or more software modules such as, for example, a process, a script, an application, an agent, a utility, a tool, an Operating System (OS) and/or the like each comprising a plurality of program instructions stored in a non-transitory medium (program store) such as the storage 232 and executed by one or more processors such as the processor(s) 230.

The processor(s) 230 may therefore execute one or more functional modules implemented using one or more software modules, one or more of the hardware modules and/or combination thereof, for example, a Traffic Control (TC) engine 220 configured to execute the process 100 and/or part thereof for controlling the traffic light(s) 212 to control and direct the vehicle traffic through the intersection 210.

Optionally, the process 100 and/or part thereof may be executed by a remote server 206, for example, a server, a computing node, a cluster of computing nodes and/or the like. This means that the process 100 may be executed by the edge node 202, by the remote server 206 and/or by a combination thereof such that one or more steps of the process 100 are executed by the edge node 202 while other one or more steps may be executed by the remote server 206.

In such case the remote server 206 may communicate via the network 204 with the imaging sensor(s) 208 and optionally with one or more control units deployed to operate the traffic light(s) 212. Optionally, the remote server 206 may communicate with the imaging sensor(s) 208 and the control unit(s) via the edge node 202 deployed at the intersection 210 serving as an intermediary to the imaging sensor(s) 208 and/or the control unit(s) connected to one or more of the I/O interfaces. Optionally the intermediary edge node 202 which only serves to relay data between the remote server 206 and the imaging sensor(s) 208 and/or the control unit(s) may be a low-end unit having limited resources computing resources, for example, limited processing resources, limited storage resources, limited networking resources and/or the like.

The remote server 206 may comprise a processor(s) 240 such as the processor(s) 230, a storage 242 such as the storage 232 for storing data and/or code (program store) and a network interface 244 such as the network interface 234 for connecting to the network 204.

The processor(s) 240, homogenous or heterogeneous, may include one or more processing nodes and/or cores arranged for parallel processing, as clusters and/or as one or more multi core processor(s). The processor(s) 240 may further, integrate, utilize and/or facilitate one or more hardware elements (modules) integrated and/or utilized in the remote server 206, for example, a circuit, a component, an Integrated Circuit (IC), an ASIC, an FPGA, a DSP, a GPU, an AI accelerator and/or the like.

The processor(s) 240 may execute one or more software modules such as, for example, a process, a script, an application, an agent, a utility, a tool, an Operating System (OS) and/or the like each comprising a plurality of program instructions stored in a non-transitory medium (program store) such as the storage 242 and executed by one or more processors such as the processor(s) 240.

The processor(s) 240 may therefore execute one or more functional modules implemented using one or more software modules, one or more of the hardware modules and/or combination thereof, for example, a remote TC engine 220 configured to execute the process 100 and/or part thereof.

Optionally, the remote server 206, specifically the remote TC engine 220 may be implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Typically, a plurality of TC engines 220, either local TC engines executed by a plurality of edge nodes and/or remote TC engines executed by one or more remote servers 206 may be deployed for controlling the traffic at a plurality of intersections 210. As such, each TC engine 220 may be associated with a respective intersection 210 or a subset of several subsequent intersections 210 which may have traffic impact on each other.

Since different traffic flows and/or traffic patterns may apply for different intersections 210, each TC engine 220 may be specifically configured, adapted, trained and/or learned to control the traffic at its associated specific intersection(s) 210 by controlling the traffic light(s) 212 deployed at the specific intersection(s) 210.

For brevity, the process 100 is described for a TC engine 220 associated with a single intersection 210 such that the TC engine 220 may control just the single intersection 210. This, however, should not be construed as limiting since the process 100 executed by the TC engine 220 may be expanded for the TC engine 220 to control several intersections 210, specifically consecutive intersections 210 which may affect and/or impact each other with respect to the traffic flow going through them.

Moreover, while the TC engine 220 may be associated with a specific intersection 210 or several specific intersections 210 and hence specifically adapted to control traffic, a plurality of TC engine 220 may be deployed each associated with a respective intersection 210 or a respective subset comprising several intersections 210. As such, each TC engine 220 may be specifically configured, adapted, trained and/or learned to efficiently control traffic in its associated intersection(s) 210.

As shown at 102, the process 100 starts with the TC engine 220 receiving visual data, for example, one or more image sequences, for example, a video stream and/or the like of the intersection 210 captured by one or more of the imaging sensors 208 deployed to monitor the intersection 210 and the vehicles traffic coming in, passing through and leaving the intersection 210.

The TC engine 220 may communicate via one or more channels with the imaging sensor(s) 208 to receive the image sequence(s). For example, in case the imaging sensor(s) 208 are network connected devices, the TC engine 220 may communicate with the imaging sensor(s) 208 via the network 204 using one or more network communication protocols. These network communication protocols may include, for example, Transmission Control Protocol (TCP), User Datagram Protocol (UDP) and/or the like as well as higher level protocols, such as, for example, Real Time Streaming Protocol (RTSP) and/or the like.

In another example, assuming the imaging sensor(s) 208 are directly connected to one or more of the I/O interfaces of the edge node 202, for example, USB channel, serial channel, WLAN network and//or the like, the TC engine 220 may communicate with the imaging sensor(s) 208 via the I/O interface(s) using one or more protocols applicable for the selected I/O interface(s).

As shown at 104, the TC engine 220 may analyze the image sequence(s) to identify vehicles, for example, a car, a truck, a bus, a motorcycle, a bicycle and/or the like in the intersection 210. The TC engine 220 may optionally further analyze the image sequence(s) to identify pedestrians in the intersection 210.

The TC engine 220 may analyze the image sequence(s) using one or more visual data analysis methods, algorithms and/or tools as known in the art. For example, the TC engine 220 may apply computer vision, image processing and/or the like to identify the vehicles in images of the image sequence(s). In another example, the TC engine 220 may use one or more ML models, for example, a classifier, a neural network, a Support Vector Machine (SVM) and/or the like trained to detect vehicles and optionally people in the images. The ML model(s) may be further trained for the specific intersection 210 such that they may adjust according to the visual parameters, attributes and/or characteristics of the specific intersection 210.

The TC engine 220 may further analyze a plurality of consecutive images of the image sequence(s) to track each vehicle moving through the intersection 210 from the time the respective vehicle is first detected in the image sequence (s) to the time the vehicle is no longer detected in the in the image sequence(s).

Optionally, the TC engine 220 analyzing the image sequence(s) may filter out, i.e., remove one or more objects unrelated to tracked vehicles detected in one or more of the images of the image sequence(s). Specifically, the TC engine 220 may filter out objects which may block, overlap and/or interfere with the vehicles detected in the image sequence(s) in order to clean the image(s) and focus on the vehicles. Such objects may include, for example, one or more infrastructure objects and/or objects located in proximity to the intersection 210, for example, transportation infrastructure objects such as, for example, traffic signs, traffic lights, power poles, informative signs, advertisement signs and/or the like.

The TC engine 220 may apply the same visual data analysis methods, algorithms and/or tools to analyze the image stream(s) to detect the unrelated object(s) which may block, overlap and/or interfere with the vehicles detected in the image sequence(s). Moreover, as the TC engine 220 may apply the ML model(s) trained and adjusted for the specific intersection 210, the ML model(s) may learn of one or more objects specific to the intersection 210 which are unrelated to vehicles and may potentially block, overlap and/or interfere with the vehicles detected in the image sequence(s). The TC engine 220 may therefore filter out the blocking, overlapping and/or interfering object(s) indicated by the ML model(s).

The TC engine 220 may further track one or more vehicles crossing the intersection 210 which are only partially visible in the image sequence(s) while located in the intersection 210. The partially visible vehicle may include one or more vehicles which are at least partially invisible in at least some of the images of the image stream(s) and potentially in all images captured during their crossing of the intersection 210. The partially visible vehicles may be at least partially invisible, for example, concealed and/or obscured by one or more blocking objects, for example, another vehicle, an unrelated infrastructure object and/or the like. In another example, the partially visible vehicle may include vehicles which are at least partially invisible and potentially completely invisible in at least some of the images captured during their crossing of the intersection 210.

The TC engine 220 may apply one or more methods, techniques and/or algorithms to track the partially visible vehicles. For example, after detecting a certain vehicle for the first time, the TC engine 220 may analyze consecutive images of the image sequence(s) and may search for partial view of the certain vehicle. In another example, after failing to detect the certain vehicle in one or more of the images, the TC engine 220 may skip to later images in which the certain vehicle may be at least partially visible and thus detectable by the TC engine 220.

In another example, the TC engine 220 may further use one or more prediction algorithms configured to track one or more of the vehicles in the intersection 210, specifically one or more of the partially visible vehicles. For example, the TC engine 220 may apply one or more trained models, for example, a statistical model, a ML model and/or the like which may be configured, adapted and/or trained to predict the location of one or more of the vehicles in the intersection 210 based on their previous location(s) identified in one or more previous images. The trained model(s) may therefore track the partially visible vehicle(s) even when only partially visible and even completely invisible in at least some of the images based on their previous location.

As shown at 106, the TC engine 220 may create one or more time-series movement patterns for the vehicles tracked in the intersection 210 and may further create one or more complementary time-series movement patterns for one or more of the lanes in the intersection 210.

The TC engine 220 may create the time-series movement pattern(s) for the tracked vehicles crossing the intersection 210 based on their position and/or location in the intersection 210 as depicted in the image sequence(s). For example, the TC engine 220 may analyze consecutive images of the image sequence(s) to identify a location and/or position change of each tracked vehicle. The analyzed consecutive images may be spaced from each other according to a predefined time interval, for example, one second, two seconds, three seconds and/or the like.

Each vehicle time-series movement pattern may therefore describe the movement over time of one or more tracked vehicles, for example, location, speed, acceleration and/or the like from the time the respective tracked vehicle is first detected in the image sequence(s), i.e., in the intersection 210, to the time the respective tracked vehicle is last detected in the image sequence(s).

Complementary, the TC engine 220 may create the time-series movement pattern(s) for each of the lanes in the intersection 210 based on the position and/or location of vehicles in the respective lane as well as their type as identified in the image sequence(s). For example, the TC engine 220 may analyze consecutive images of the image sequence(s) to identify all vehicles located in a certain lane, their type and/or the like. Each lane time-series movement pattern may therefore describe the movement over time of vehicles in the respective lane.

As shown at 108, the TC engine 220 may generate a traffic dataset descriptive of the time series movement patterns of all vehicles detected and tracked in the intersection 210 and/or of the time series movement patterns of all lanes in the intersection 210.

The traffic dataset may be created as a mathematical representation of the vehicles traffic detected in the intersection 210 over time in order to support efficient, accurate and/or robust processing of the time series movement patterns of the tracked vehicles. The traffic dataset may be therefore based on the time-series movement patterns created for the tracked vehicles.

The traffic dataset may comprise one or more vehicle parameters of each vehicle tracked in the intersection 210 and may further include one or more lane parameters of each lane in the intersection 210 derived from the time series movement patterns of the tracked vehicles and/or from the time series movement patterns created for the lanes.

The vehicle parameters may therefore include, for example, a vehicle type (e.g. car, truck, bus, motorcycle, etc.), a lane(s) in which the respective tracked vehicle is moving, a position in the lane, a position in a queue in the lane, a location, a relative location with respect to one or more other vehicles, a type of one or more adjacent vehicles, a speed, an acceleration, a wait time at the intersection 210, a distance form a stop line in the intersection 210, an overall tracking time (from time of first detection in the image sequence(s) to the time of last detection) and/or the like.

The lane parameters of each lane may include, for example, a number of vehicles in the respective lane, a type of vehicles in the respective lane, an order of the vehicles in a queue in the respective lane, a length of the queue, a lane crossing time duration and/or the like.

The TC engine 220 may create, for example, a respective vector for each tracked vehicle to represent and describe the respective time-series movement pattern of the receptive tracked vehicle. The vector of each tracked vehicle may therefore comprise the vehicle parameters extracted from the time-series movement pattern if the respective vehicle. Moreover, the vector of each tracked vehicle may include a plurality of values of the extracted vehicle parameters as they change over time.

Similarly, the TC engine 220 may create a vector for each of the lanes in the intersection 210 which may comprise the lane parameters identified for the respective lane over time.

Figure 3:
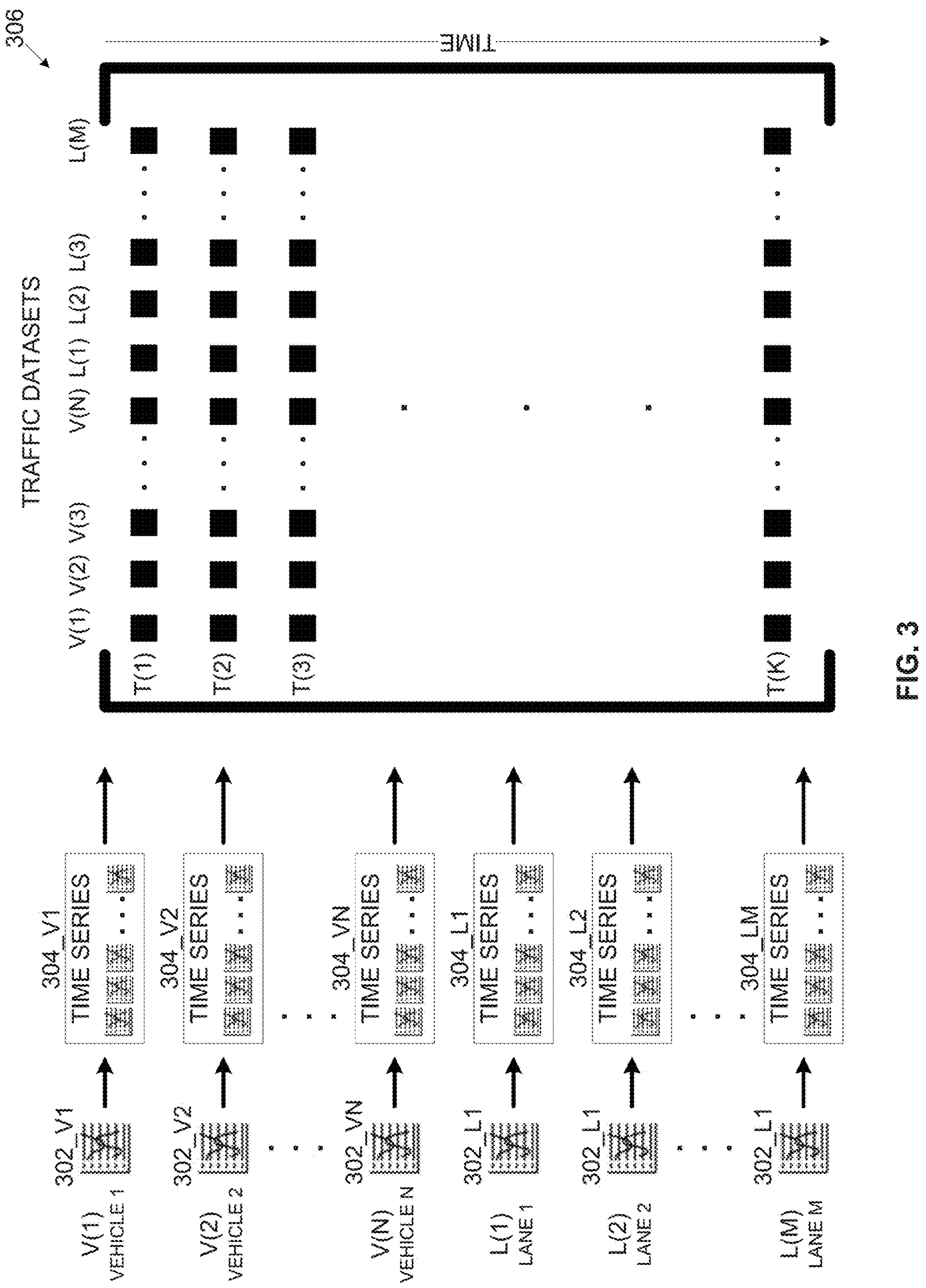
FIG. 3 is a schematic illustration of an exemplary traffic dataset descriptive of time series movement patterns of vehicles tracked in an intersection generated to map traffic patterns of vehicles crossing the intersection, according to some embodiments of the present invention.

Reference is now made to FIG. 3, which is a schematic illustration of an exemplary traffic dataset descriptive of time series movement patterns of vehicles tracked in an intersection generated to map traffic patterns of vehicles crossing the intersection, according to some embodiments of the present invention.

A plurality of vehicles, for example, N vehicles may be tracked by a TC engine such as the TC engine 220 while crossing an intersection such as the intersection 210.

As described herein before, the TC engine 220 may identify the location 302 of each of the N tracked vehicle, for example, a location 302_V1 of a first vehicle, a location 302_V2 of a second vehicle to a $N^{th}$ location 302_VN of a $N^{th}$ vehicle. In particular, the TC engine 220 may identify a plurality of locations 302 of each tracked vehicle over time based on analysis of consecutive images spaced according to the predefined time interval, for example, one second, two seconds, three seconds and/or the like.

The TC engine 220 may create a respective time-series movement pattern 304 for the each of the tracked vehicles accordingly such that the time-series movement pattern of each vehicle may comprise and/or describe one or more of the vehicle parameters of the respective vehicle. For example, the TC engine 220 may create a first time-series movement pattern 304_V1 for the first vehicle, a time-series movement pattern 304_V2 for the second vehicle and so one to a time-series movement pattern 304_VN created for the $N^{th}$ vehicle.

Complementary, based on the location of the N vehicles detected and tracked in the intersection 210, specifically with respect to the lane(s) in which the vehicles are tracked, the TC engine 220 may create a plurality of locations of the vehicles in each of the lanes, for example, a location 302_L1 of all vehicles detected in a first lane, a location 302_L2 of all vehicles detected in a second lane to a location 3902_LM of all vehicles detected in an $M^{th}$ lane.

Moreover, the TC engine 220 may create a respective time-series movement pattern 304 for the each of the lanes in the intersection 210 accordingly such that the time-series movement pattern of each lane may comprise and/or describe one or more of the lane parameters of the respective lane. For example, the TC engine 220 may create a first time-series movement pattern 304_L1 for the first lane, a time-series movement pattern 304_L2 for the second lane and so one to a time-series movement pattern 304_LM created for the $M^{th}$ lane.

Based on the time-series movement patterns 304 of the N vehicles tracked in the intersection 210 and of the lanes in the intersection 210, the TC engine 220 may generate a traffic dataset 306 descriptive of the traffic in the intersection 210. Specifically, the traffic dataset 306 may describe in a mathematically convenient format the vehicle parameters identified for N vehicles tracked in the intersection 210 as well as the lane parameters identified for each of the lanes in the intersection 210 over time.

As seen, the traffic dataset 306 may be constructed as a matrix in which each of the N vehicle and M lanes may be mapped to a respective vector, for example, a column in the traffic dataset 306 matrix, where each raw in the traffic dataset 306 matrix may be mapped to a respective point in time, i.e., a time stamp, for example, a time T(1), a time T(2), a time T(3) to a time T(N). The time interval between consecutive time stamps may be set according to the predefined interval, for example, one second, two seconds, here seconds and/or the like.

As such, each item in the matrix representing the traffic dataset 306 may include one or more vehicle parameters of a respective vehicle at a respective point if time (time stamp).

The traffic dataset 306 may be constructed to further include one or more vectors each corresponding to a respective lane in the intersection 210. As described for the vehicle vectors, each lane vector may comprise the lane parameters identified in the respective corresponding lane over time.

Reference is made once again to FIG. 1.

As shown at 110, the TC engine 220 may apply a trained first ML model to the traffic dataset to map one or more (current) traffic patterns of the tracked vehicles to one or more of a plurality of traffic patterns typical to the intersection 210 as learned by the trained first ML model.

This means that the trained first ML model may map the traffic flow of the vehicles in the intersection 210 as reflected by the traffic dataset(s) to one or more of the traffic patterns previously learned by the trained first ML model for the intersection 210. Moreover, since the traffic dataset may be descriptive of the traffic flow through the intersection 210 over time, the trained first ML model may map the traffic dataset to a consecutive mapping sequence comprising one or more consecutive traffic patterns traffic patterns mapped for the traffic flowing through the intersection(s) over time.

The first ML model, for example, a neural network such as, for example, a CNN, an RNN, a FF Neural Network, a DNN and/or the like may be trained with a plurality of traffic datasets. The first ML model may be trained to map the traffic patterns of vehicles detected and tracked in the intersection 210 using a plurality of traffic datasets generated for the intersection 210 based on image sequences previously captured in the past to depict vehicles traffic in the intersection 210.

The first ML model may therefore adjust, adapt, evolve and/or learn the traffic patterns typical to the specific intersection 210. Different first ML models associated with different intersections 210 may be therefore trained using traffic datasets generated for their associated intersections 210 and may thus each evolve and learn differently to specifically adapt to map the traffic patterns typical to its respective associated intersection 210.

Moreover, the traffic datasets generated for training the first ML model may be generated based on previously captured image sequences captured in the past during different times, for example, different time of the day, different days of the week, different times of the year and/or the like. This may enable the first ML model to adapt and adjust to map traffic patterns which may change during different times. For example, in the morning heavy traffic may cross the intersection 210 from west to cast while only little traffic is crossing the intersection 210 on the opposite direction, i.e., from cast to west. However, during evening hours, the traffic flow may change such that heavy traffic may flow from east to west and significantly lower traffic volume may flow in the opposite direction. In another example, traffic flow may be significantly different during weekend compared to week day traffic. In another example, the volume of traffic flowing through the intersection 210 during different times of the year, for example, during holidays, during school vacations and/or the like may be different from the volume of traffic crossing the intersection 210 at other times of the year.

The first ML model may be trained in an unsupervised manner during one or more unsupervised training session to map the training traffic datasets to a plurality of clusters corresponding to the plurality of traffic patterns typical to the intersection 210. For example, assuming that during the unsupervised training session(s) the first ML model creates a certain number of distinct clusters, for example, 16 clusters based on the training traffic datasets. In practice the each of the clusters may express a respective traffic pattern such that the trained first ML model may map each received traffic dataset to one or more of the 16 traffic patterns based on the clusters in which the received traffic dataset falls.

Naturally different traffic patterns may be typical to different intersections 210. However, since each first ML model associated with respective intersection(s) 210 is trained and adapted for its specific associated intersection(s) 210, each trained first ML model may adapt accordingly to create a plurality of clusters representative of traffic patterns typical to its associated intersection(s) 210.

Optionally, the first ML model may be further trained post-deployment, i.e. after deployed to support control of traffic in its associated specific intersection 210, using a plurality of traffic datasets generated based on a plurality of image sequences captured to depict and monitor vehicle traffic at the intersection 210 after the deployment of the trained first ML model. The post-deployment training may enable the first ML model to further adapt and adjust to identify and map one or more new and/or adjusted traffic patterns of the traffic in the intersection 210 which may be affected from one or more traffic changes and/or new conditions. For example, construction work at the intersection 210 and/or in its near proximity may increase traffic congestion at the intersection 210. In another example, one or more detour routes to bypass other road sections and/or intersections may be directed through the intersection 210 which may increase traffic through the intersection 210. In another example, changes in population volume and/or change commuting behavior of people may change, for example, increase and/or decrease the volume of traffic moving through the intersection 210.

The first ML model may therefore change and/or adjust the clustering of the traffic patterns distribution space according to the changed traffic flows. For example, the first ML model may create one or more additional clusters and/or remove one or more clusters. In another example, the first ML model may change the clustering scheme and create a set of new clusters according. For example, continuing the previous example, assuming the first ML model initially cerates 16 clusters. However, following one or more changes to the traffic flow over time after the first ML model is deployed, based on the new traffic flows of vehicles through the intersection 210, the first ML model may change the clustering scheme to include only 8 clusters into which traffic datasets may be mapped.

As shown at 112, the TC engine 220 may apply a trained second ML model to predict one or more subsequent traffic patterns estimated for the vehicle traffic in the intersection 210 based on the (current) traffic pattern(s) mapped by the trained first ML model, specifically based on the consecutive mapping sequence comprising consecutive traffic patterns mapped by the trained first ML model for the traffic flowing through the intersection 210 over time.

The second ML model, for example, a neural network such as, for example, a CNN, an RNN, an FF Neural Network, a DNN and/or the like may be trained with a plurality of consecutive mapping sequences comprising consecutive traffic patterns mapped by the first ML model for the intersection 210.

The trained second ML model may be trained to predict the subsequent traffic pattern(s) in a supervised manner in one or more supervised training sessions using the plurality of consecutive mapping sequences each comprising consecutive traffic patterns mapped by the first ML model for the intersection 210 based on plurality of traffic datasets generated based on a plurality of previously captured image sequences depicting the traffic in the intersection 210.

The second ML model may therefore adjust, adapt, evolve and/or learn the traffic patterns, specifically the traffic patterns sequences typical to the specific intersection 210. As described for the first ML model, different second ML models associated with different intersections 210 may be trained using consecutive mapping sequences mapped for their associated intersections 210 by corresponding first ML models also adapted to the associated intersections 210. Each second ML model may thus evolve and learn differently to specifically adapt to predict the subsequent traffic pattern(s) typical to its respective associated intersection 210.

Moreover, the plurality of consecutive mapping sequences used for training the second ML model may be mapped for traffic flows detected in the intersection 210 during different times, for example, during different time of the day, during different days of the week, during different times of the year and/or the like. This may enable the second ML model to adapt and adjust to accurately, reliably and/or effectively predict subsequent traffic pattern(s) following the time dependent consecutive mapping sequence(s) as mapped by the first ML model based on traffic patterns which may change during different times.

For example, continuing the previous example, assuming the first ML model is trained to map each traffic pattern to one or more of 16 distinct clusters representing 16 traffic patterns. During the training session(s) using the training consecutive mapping sequences produced by the trained first ML model, the trained second ML model may adjust, adapt and/or otherwise learn to accurately and/or reliably predict with high probability which traffic pattern(s) follow each consecutive mapping sequence. For example, during the training, the second ML model may determine and learn that a certain consecutive mapping sequence comprising a $1^{st}$ traffic pattern, a $5^{th}$ traffic pattern and a $12^{th}$ traffic pattern of the 16 traffic patterns is typically followed by the $2^{nd}$ traffic pattern of the 16 traffic patterns. In such case, after trained, the trained second ML model receiving the certain consecutive mapping sequence may therefore predict that the subsequent traffic pattern is the $2^{nd}$ of the 16 traffic patterns.

Moreover, the second ML model may evolve and learn to identify that one or more consecutive mapping sequences may be followed by different subsequent traffic pattern(s) during different times, for example, different time of the day, of the week, of the year and/or the like. Furthermore, consecutive mapping sequences may be followed by different subsequent traffic pattern(s) at different intersections 210. However, since each second ML model associated with respective intersection(s) 210 is trained and adapted for its specific associated intersection(s) 210, each trained second ML model may adapt accordingly to predict the subsequent traffic pattern(s) typical to its associated intersection(s) 210.

Optionally, the second ML model may be further trained post-deployment, i.e. after deployed to support control of traffic in its associated specific intersection 210. The second ML model may be further trained after deployed using a plurality of consecutive mapping sequences of traffic patterns mapped by its corresponding first ML model based on a plurality of traffic datasets generated based on a plurality of image sequences captured to depict and monitor vehicle traffic at the intersection 210. As described for the first ML model, the post-deployment training may enable the second ML model to further adapt and adjust to one or more new consecutive mapping sequences mapped by the first ML model as result of the traffic changes and/or new conditions to accurately, reliably and/or effectively predict the subsequent traffic pattern(s) which may follow the new consecutive mapping sequence(s).

As shown at 114, the TC engine 220 may select a control plan for operating and/or controlling one or more of the traffic lights 212 in the intersection 210 according to the predicted subsequent traffic pattern(s).

The TC engine 220 may further generate and output instructions for controlling the traffic light(s) 212 according to the selected control plan. For example, the TC engine 220 may generate instructions for one or more control units of one or more of the traffic lights 212 deployed in the intersection 210 to operate their respective traffic light(s) 212 according to the selected control plan. The TC engine 220 may then transmit the instructions to the control unit(s) via the network 204 and/or via one or more of the I/O interfaces of the edge node 202.

The TC engine 220 may select the control plan according to one or more optimization criteria, for example, reduce an overall time of vehicles to cross the intersection 210, reduce an overall wait time of vehicles in the intersection 210, reduce a crossing (travel) time in one or more lanes in the intersection 210, reduce traffic congestion and/or the like in order to select an optimal control plan. For example, a first optimization criterion may define reducing an overall wait time of vehicles in the intersection 210. In such case, the TC engine 220 may select a first control plan which may reduce the average wait time of all vehicles in the intersection 210. However, a second optimization criterion may define reducing a wait time of vehicles crossing the intersection 210 in a certain lane, for example, cast to west which may be predicted to cause a potential future major traffic jam. In such case, the TC engine 220 may select a second control plan which may reduce the wait time for vehicles crossing the intersection 210 in the certain east to west lane while potentially increasing the wait time of other vehicles crossing the intersection 210 in other lanes.

In another example, the optimization criteria may define maximizing a volume of commuters crossing the intersection 210 in the vehicles. In such case, the TC engine 220 may select a certain control plan which may most efficiently reduce the overall cross time of the intersection 210 by one or more high volume commuting vehicles, for example, a bus, a shuttle, a taxi and/or the like predicted to cross the intersection 210 according to the subsequent traffic pattern(s). In another example, the optimization criteria may relate to clearing the intersection 210 from traffic slow-down vehicles, for example, trucks, heavy load vehicles, wide vehicles and/or the like. In such case the TC engine 220 may select a control plan which may reduce the overall cross time of the intersection 210 by the traffic slow-down vehicles predicted to cross the intersection 210 according to the subsequent traffic pattern(s).

Moreover, TC engine 220 may select the optimal control plan based on simulation of a plurality of control plans applied for controlling the traffic light(s) 212 to control the vehicle traffic estimated by the subsequent traffic pattern(s) predicted for the intersection 210. Optionally, the TC engine 220 may simulate at least some of the control plans for a combination of current traffic patterns mapped by the first ML model for current vehicle flows in the intersection 210 combined with one or more of the predicted subsequent traffic pattern(s).

Based on the simulation, the TC engine 220 may select a control plan which is optimal according to one or more selected optimization criteria, for example, an optimal control plan estimated to yield a lowest overall wait time for the vehicles in the intersection 210 among all of the simulated control plans.

Each of the control plans may define one or more control parameters for controlling the traffic light(s) 212 at the intersection 210, for example, duration of green-light time period, duration of red-light time period, an order of green-light periods across multiple traffic lights 212 and/or the like. One or more of the control plans may further define one or more of the control parameters for one or more pedestrian related traffic lights 212, i.e. traffic lights 212 operated to control pedestrian traffic in the intersection 210.

One or more of the plurality of control plans may be predefined for the intersection 210, for example, by one or more expert users. Moreover, one or more of the predefined control plans may be adjusted, updated, added and/or removed based on analysis of the traffic control at the intersection 210 over time. For example, in case a certain control plan is determined to ineffective, for example, a control plan which is never selected by the TC engine 220, the certain control plan may be removed. In another example, assuming that based on analysis of real-world traffic through the intersection 210, it is determined that a new not currently control plan may effectively reduce one or more of the optimization criteria for one or more of the predicted subsequent traffic patterns, the new control plan may be added for use by the TC engine 220.

However, one or more of the control plans may be learned using one or more control ML models associated with the intersection 210 and trained accordingly. For example, the control ML model(s) may learn that adjusting one or more control parameters of a certain control plan may increase efficiency of the certain control plan for effectively controlling a certain traffic pattern of traffic flowing through the intersection 210, for example, reduce the wait at the intersection 210, reduce the crossing time through the intersection 210 and/or the like. In such case, the control ML model(s) may generate one or more new control plans having the adjusted control parameter(s).

Each of the control plans, predefined and/or learned, may fully comply with traffic laws and regulations applicable for the intersection 210, for example, international, national, regional, county, etc. law and/or regulation.

The process 100 is an iterative process where in each iteration the current traffic flow in the intersection 210 may be analyzed again and mapped by the first ML model to one or more of the traffic patterns. The second ML may then predict the subsequent traffic pattern(s) based on the current mapped traffic patterns and a control plan may be selected accordingly for operating the traffic light(s) 212 to regulate the traffic in the intersection 210.

Figure 4:
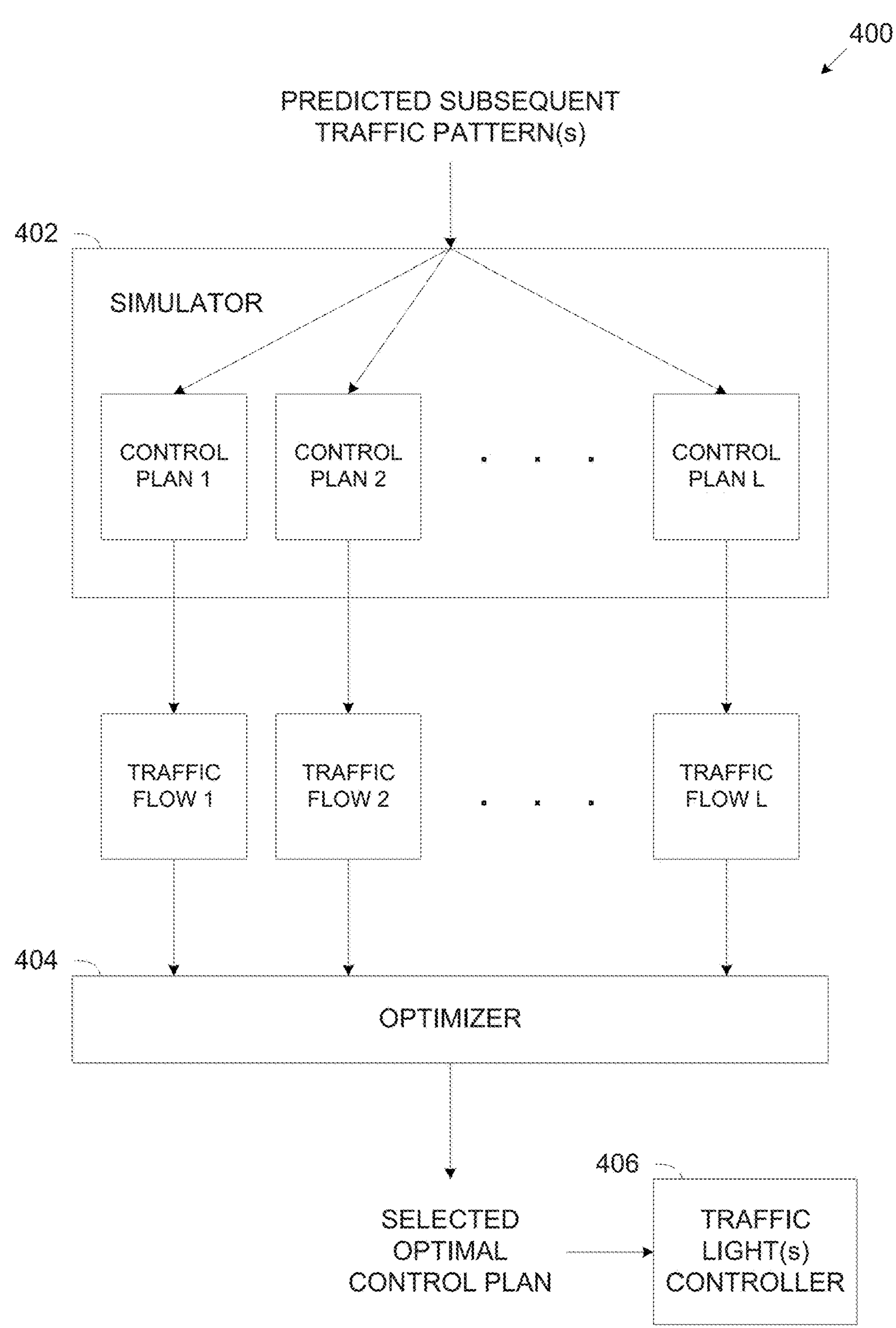
FIG. 4 is a schematic illustration of an exemplary flow of simulating a plurality of alternative control plans for controlling traffic light(s) at an intersection for a traffic flow defined by a traffic pattern predicted for vehicles crossing the intersection, according to some embodiments of the present invention.

Reference is now made to FIG. 4, which is a schematic illustration of an exemplary flow of simulating a plurality of alternative control plans for controlling traffic light(s) at an intersection for a traffic flow defined by a traffic pattern predicted for vehicles crossing the intersection, according to some embodiments of the present invention.

An exemplary flow 400 may be executed by a TC engine such as the TC engine 220 to simulate a plurality of control plans for controlling one or more traffic lights such as the traffic light 212 deployed to control and direct vehicle traffic in an intersection such as the intersection 210.

A simulator 402 used by the TC engine 220 may receive one or more subsequent traffic patterns predicted by the second ML model based on the consecutive mapping sequence mapped by the first ML model. The simulator 402 may apply one or more techniques, methods and/or algorithms as known in the art to simulate traffic flows through the intersection 210 as result of applying at least some of the predefined and/or learned control plans applicable for the intersection 210 to control the traffic light(s) 212 for regulating (controlling) the traffic of vehicles estimated to cross the intersection 210 according to the predicted subsequent traffic pattern(s).

For example, the simulator 402 may determine that applying a $1^{st}$ control plan (control plan 1) to regulate the vehicle traffic estimated to cross the intersection 210 may yield a $1^{st}$ traffic flow (traffic flow 1), applying a $2^{nd}$ control plan (control plan 2) may yield a $2^{nd}$ traffic flow (traffic flow 2) and so on to a simulated $L^{th}$ control plan (control plan L) which may yield an $L^{th}$ traffic flow (traffic flow L) through the intersection 210.

The TC engine 220 may apply an optimizer 404 to select one of the L control plans which yields an optimal traffic flow according to one or more of the optimization criteria. Moreover, the optimizer 404 may be applied to conduct a multi-objective optimization to satisfy multiple optimization criteria, for example, two or more optimization criteria.

The TC engine 220 may then provide, for example, transmit instructions to one or more control units 406 to operate the traffic light(s) 212 according to selected optimal control plan in order to regulate accordingly the traffic of vehicles through the intersection 210.

Evidently, the vehicle traffic may dynamically change in response to operating one or more of the traffic lights 212 at the intersection 210 according to one or more of the control plans and optionally in response to operating traffic lights 212 deployed in one or more other intersections 210 which may affect traffic in the intersection 210.

To overcome this limitation, the first ML model and/or the second ML model trained post-deployment may be optionally further trained to adapt, adjust, evolve and/or learn traffic flows and traffic patterns which may result from applying one or more of the control plans.

For example, the first ML model may be therefore further trained using traffic datasets descriptive of traffic flows through the intersection 210 which may be affected by operating the traffic light(s) 212 according to one or more of the control plans. As such the first ML model may change and/or adjust the clustering of the traffic patterns distribution space according to the potentially affected traffic flows as reflected by the traffic datasets. For example, the first ML model may create one or more additional clusters. In another example, the first ML model may change the clustering scheme and create a set of new clusters according to the traffic datasets descriptive of the affected traffic flows. Complementary, the second ML model may be further trained using additional consecutive mapping sequences mapped by the first ML model for one or more of the affected traffic flows.

Figure 5:
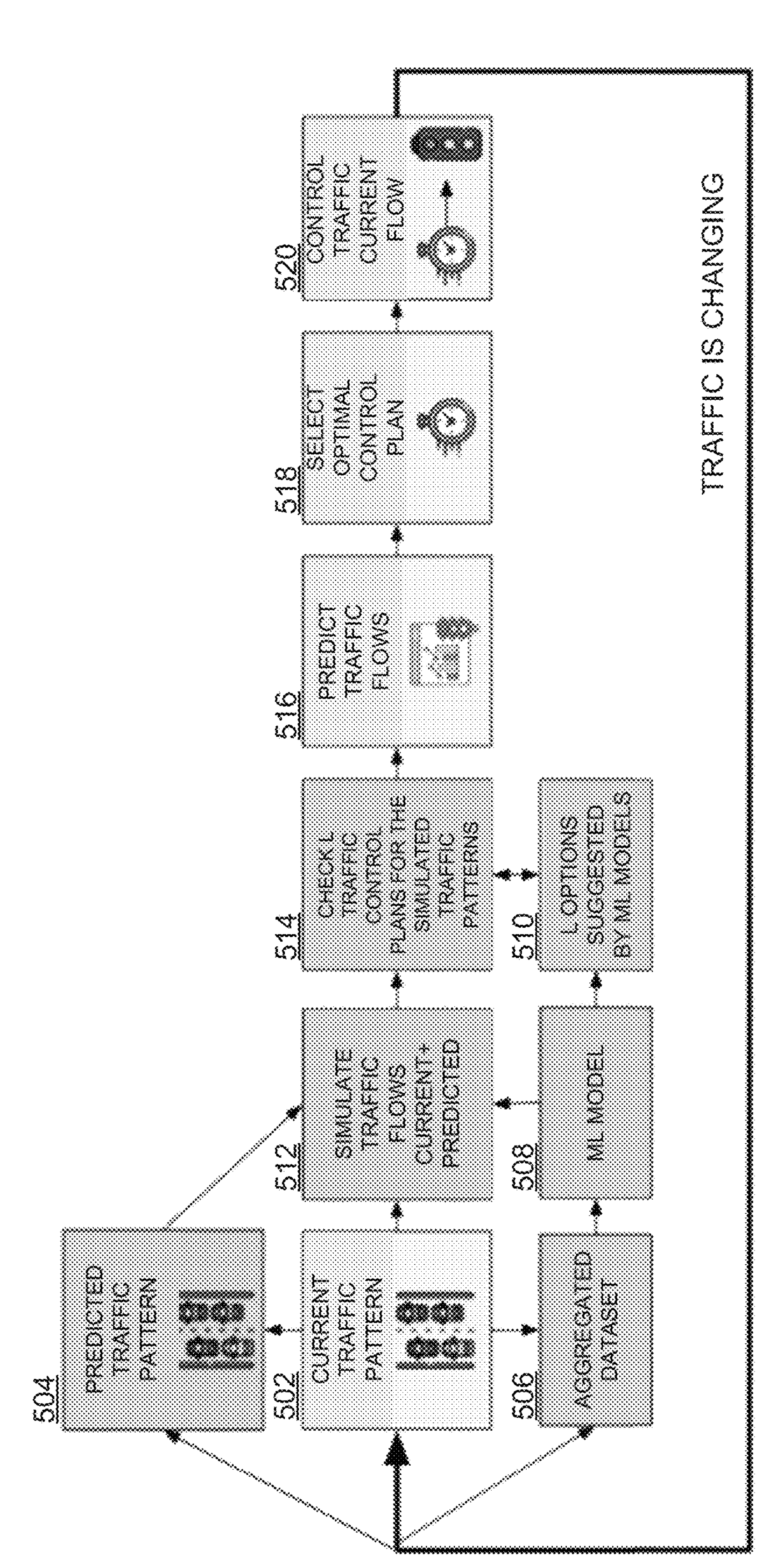
FIG. 5 is a schematic illustration of an exemplary flow of mapping traffic pattern of current vehicle traffic flow in an intersection, predicting subsequent traffic pattern in the intersection, simulating multiple traffic light(s) control plans and selecting an optimal control plan, according to some embodiments of the present invention.

Reference is now made to FIG. 5, which is a is a schematic illustration of an exemplary flow of mapping traffic pattern of current vehicle traffic flow in an intersection, predicting subsequent traffic pattern in the intersection, simulating multiple traffic light(s) control plans and selecting an optimal control plan, according to some embodiments of the present invention.

An exemplary flow 500 following the process 100 may be executed by a TC engine such as the TC engine 220 to control one or more traffic lights such as the traffic light 212 deployed to regulate (control) vehicles traffic through an intersection such as the intersection 210. As seen, the flow 500 is an iterative process with feedback since operating the traffic light(s) 212 according to the selected control plan may impact the traffic flow in the intersection 210 and anther iteration of the process may be initiated to manage the traffic flow which may be typically impacted by the previously selected control plan.

A TC engine such as the TC engine 220 may generate one or more traffic datasets such as the traffic dataset 306 based on a plurality of time-series movement patterns created for vehicle tracked in the intersection 210 and lanes in the intersection 210 to express the time-series movement patterns of the currently traffic flow in the intersection 210.

The TC engine 220 may apply the unsupervised trained first ML model to map the current traffic flow in the intersection 210 to a current traffic pattern (502) based on the traffic dataset(s) 306 descriptive of the current traffic flow.

The TC engine 220 may apply the supervised trained second ML model to predict a subsequent traffic pattern (504) based on the current traffic pattern mapped by the trained first ML model.

Traffic data, for example, traffic flow data, mapped traffic patterns, predicted traffic patterns, traffic light(s) control plans and/or the like may be continuously collected, for example, by the TC engine 220, to generate an aggregated dataset (506).

The aggregated dataset may be used for one or more purposes, for example, training one or more ML models (508) to learn the influence (impact) of selected control plans on traffic patterns and/or on subsequent traffic pattern and adjust accordingly.

The ML model(s) may therefore evolve and adapt to the traffic flow detected in the intersection 210 (510). In particular, the ML model(s) may learn which control plans may be most efficient for each of the predicted subsequent traffic patterns typically coupled with the current traffic pattern. Moreover, based on the aggregated dataset, specifically based on the impact of control plans on subsequent traffic flow, the ML model(s) may determine that one or more of the control plans are inefficient and may discard them. Furthermore, the ML model(s) may generate one or more new control plans estimated to improve the flow of traffic through the intersection 210.

The TC engine 220 may simulate (512) traffic flows based on the current and predicted traffic patterns and may further apply L control plans (512) to regulate the simulated traffic flow. As described herein before, the control plans may define different control parameters for the traffic light(s) 212 at the intersection 210, for example, green-light time duration, duration of red-light time, order of green-light across multiple traffic lights 212 and/or the like. As seen and as described herein before, while some of the control plans may be predefined, one or more of the control plans may be learned by the ML models (510) and applied accordingly.

The traffic flow regulated by the traffic light(s) operated according to each of the L control plans may be predicted (516) and the TC engine 220 may select an optimal control plan (518) predicted to yield a predicted traffic flow that is optimal according to one or more of the optimization criteria.

The traffic light(s) 212 may be then operated according to the selected control plan (520) to regulate the current traffic flow in the intersection 210. As seen, operating the traffic light(s) 212 to regulate the current traffic flow in the intersection 210 may introduce a feedback path since the traffic flow in the intersection 210 may change due to the regulation induced by the traffic light(s) 212 operated according to the selected control plan.

Another iteration (cycle) of the sequence 500 may be therefore initiated to predict the subsequent traffic pattern for the current traffic pattern reflecting the traffic flow which may be affected by the control plan selected to operate the traffic light(s) 212 in the intersection 210. This iterative process may repeat over and over.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of controlling traffic lights according to predicted traffic patterns, comprising:

receiving at least one image sequence comprising a plurality of images captured by at least one imaging sensor deployed to monitor vehicle traffic in at least one intersection, at least one traffic light is deployed in the at least one intersection to control traffic flow;

generating a plurality of vehicle time-series movement patterns, each descriptive of movement over time of a respective vehicle tracked in the at least one image sequence, and a plurality of lane time-series movement patterns, each descriptive of movement over time of vehicles in a respective lane of the at least one intersection;

generating a traffic dataset based on the plurality of vehicle time-series movement patterns and the plurality of lane time-series movement patterns, the traffic dataset descriptive of time series movement of all vehicles tracked in the at least one image sequence;

applying a first trained machine learning model to map, based on the traffic dataset, a traffic pattern of the tracked vehicles to at least one of a plurality of learned traffic patterns, thereby creating a consecutive mapping sequence comprising consecutive traffic patterns mapped for traffic flowing through the at least one intersection over time;

applying a second trained machine learning model to predict at least one subsequent traffic pattern based on the consecutive mapping sequence; and generating instructions for controlling the at least one traffic light according to the at least one predicted subsequent traffic flow.

2. The computer implemented method of claim 1, further comprising generating the instructions for controlling the at least one traffic light according to a control plan selected based on a simulation of a plurality of control plans applied to control the at least one traffic light for controlling a flow of vehicles defined by the at least one predicted subsequent traffic flow.

3. The computer implemented method of claim 2, wherein the simulation is directed to predict a flow of vehicles through the at least one intersection where the selected control plan is estimated to induce optimal flow expressed by a reduced time for the vehicles to pass the at least one intersection.

4. The computer implemented method of claim 1, wherein the traffic dataset comprises at least one of: at least one vehicle parameter of each tracked vehicle and at least one lane parameter of each lane in the at least one intersection, the at least one vehicle parameter and the at least one lane parameter are identified based on analysis of the at least one image sequence.

5. The computer implemented method of claim 4, wherein the at least one vehicle parameter is a member of a group consisting of: a vehicle type, a lane, a position in the lane, a position in a queue in the lane, a location, a relative location with respect to at least one another vehicle, a type of adjacent vehicles, a speed, an acceleration, a wait time at the at least one intersection, a distance form a stop line of the at least one intersection, and an overall tracking time.

6. The computer implemented method of claim 4, wherein the at least one lane parameter is a member of a group consisting of: a number of vehicles in the lane, a type of vehicles in the lane, an order of the vehicles in of a queue in the lane, a length of the queue and a lane crossing time duration.

7. The computer implemented method of claim 4, wherein the analysis further comprises filtering out at least one object unrelated to tracked vehicles detected in the at least one image sequence.

8. The computer implemented method of claim 4, wherein the analysis further comprises applying at least one trained model to track at least one partially visible vehicle in the at least one image sequence, the at least one partially visible vehicle is at least partially invisible in at least one of the plurality of images.

9. The computer implemented method of claim 1, wherein the first machine learning model is trained using a plurality of traffic datasets generated based on a plurality of previously captured image sequences of the at least one intersection.

10. The computer implemented method of claim 1, wherein the first machine learning model is trained in at least one unsupervised training session to map the plurality of traffic patterns of vehicles detected at the at least one intersection to a plurality of respective clusters.

11. The computer implemented method of claim 1, wherein the first machine learning model is further trained post-deployment using a plurality of traffic datasets generated based on a plurality of image sequences captured after the deployment.

12. The computer implemented method of claim 1, wherein the second machine learning model is trained in at least one supervised training session using a plurality of consecutive mapping sequences of a plurality of traffic datasets generated based on a plurality of previously captured image sequences of the at least one intersection.

13. The computer implemented method of claim 1, wherein the second machine learning model is further trained post-deployment using a plurality of consecutive mapping sequences of a plurality of traffic datasets generated based on a plurality of image sequences of the at least one intersection captured after the deployment.

14. The computer implemented method of claim 1, wherein at least part of the process to control the at least one traffic light is executed by an edge node deployed at the at least one intersection which is functionally coupled to the at least one imaging sensor.

15. The computer implemented method of claim 1, wherein at least part of the process to control the at least one traffic light is executed by a remote server which is communicatively coupled to the at least one imaging sensor via at least one network.

16. A system for controlling traffic lights according to predicted traffic patterns, comprising:

at least one processor executing a code, the code comprising:

code instructions to receive at least one image sequence comprising a plurality of images captured by at least one imaging sensor deployed to monitor vehicle traffic in at least one intersection, at least one traffic light is deployed in the at least one intersection to control traffic flow;

code instructions to generate a plurality of vehicle time-series movement patterns, each descriptive of movement over time of a respective vehicle tracked in the at least one image sequence, and a plurality of lane time-series movement patterns, each descriptive of movement over time of vehicles in a respective lane of the at least one intersection;

code instructions to generate a traffic dataset based on the plurality of vehicle time-series movement patterns and the plurality of lane time-series movement patterns, the traffic dataset descriptive of time series movement of all vehicles tracked in the at least one image sequence;

code instructions to apply a first trained machine learning model to map, based on the traffic dataset, a traffic pattern of the tracked vehicles to at least one of a plurality of learned traffic patterns;, thereby creating a consecutive mapping sequence comprising consecutive traffic patterns mapped for traffic flowing through the at least one intersection over time;

code instructions to apply a second trained machine learning model to predict at least one subsequent traffic pattern based on the consecutive mapping sequence; and code instructions to generate instructions for controlling the at least one traffic light according to the at least one predicted subsequent traffic flow.

17. A computer program product for controlling traffic lights according to predicted future traffic flow, comprising a non-transitory medium storing thereon computer program instructions which, when executed by at least one hardware processor, cause the at least one hardware processor to:

receive at least one image sequence comprising a plurality of images captured by at least one imaging sensor deployed to monitor vehicle traffic in at least one intersection, at least one traffic light is deployed in the at least one intersection to control traffic flow;

generate a plurality of vehicle time-series movement patterns, each descriptive of movement over time of a respective vehicle tracked in the at least one image sequence, and a plurality of lane time-series movement patterns, each descriptive of movement over time of vehicles in a respective lane of the at least one intersection;

generate a traffic dataset based on the plurality of vehicle time-series movement patterns and the plurality of lane time-series movement patterns, the traffic dataset descriptive of time series movement of all vehicles tracked in the at least one image sequence;

apply a first trained machine learning model to map, based on the traffic dataset, a traffic pattern of the tracked vehicles to at least one of a plurality of learned traffic patterns, thereby creating a consecutive mapping sequence comprising consecutive traffic patterns mapped for traffic flowing through the at least one intersection over time;

apply a second trained machine learning model to predict at least one subsequent traffic pattern based on the consecutive mapping sequence; and generate instructions for controlling the at least one traffic light according to the at least one predicted subsequent traffic flow.

* * * * *